United States Patent
John et al.

(10) Patent No.: US 8,782,313 B2
(45) Date of Patent: Jul. 15, 2014

(54) METHOD AND APPARATUS FOR ENTERPRISE BROKERING OF USER-CONTROLLED AVAILABILITY

(75) Inventors: Ajita John, Holmdel, NJ (US); Reinhard P. Klemm, Basking Ridge, NJ (US); Doree D. Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1003 days.

(21) Appl. No.: 11/047,001

(22) Filed: Jan. 31, 2005

(65) Prior Publication Data

US 2006/0174250 A1 Aug. 3, 2006

(51) Int. Cl.
- *G06F 12/00* (2006.01)
- *G06F 3/00* (2006.01)
- *G06F 15/177* (2006.01)
- *F21S 10/00* (2006.01)

(52) U.S. Cl.
USPC ............ 710/241; 719/313; 116/202; 709/221

(58) Field of Classification Search
USPC ................... 709/313, 221; 116/202; 710/241; 719/313
See application file for complete search history.

(56) References Cited

U.S. PATENT DOCUMENTS

| | | | |
|---|---|---|---|
| 6,647,425 B1 * | 11/2003 | Chaddha | 709/233 |
| 6,707,562 B1 * | 3/2004 | Lensing | 356/630 |
| 6,748,382 B1 * | 6/2004 | Mohan et al. | 707/10 |
| 6,865,268 B1 * | 3/2005 | Matthews et al. | 379/265.09 |
| 6,983,375 B2 * | 1/2006 | Zhang et al. | 726/35 |
| 6,991,162 B2 * | 1/2006 | Chang | 235/440 |
| 7,076,562 B2 * | 7/2006 | Singhal et al. | 709/232 |
| 7,174,557 B2 * | 2/2007 | Sanghvi et al. | 719/318 |
| 2002/0016840 A1 * | 2/2002 | Herzog et al. | 709/225 |
| 2002/0172169 A1 * | 11/2002 | Rosen et al. | 370/335 |
| 2002/0194317 A1 * | 12/2002 | Kanada et al. | 709/223 |
| 2003/0028680 A1 * | 2/2003 | Jin | 709/313 |
| 2003/0031309 A1 * | 2/2003 | Rupe et al. | 379/265.02 |
| 2003/0101247 A1 * | 5/2003 | Kumbalimutt et al. | 709/221 |
| 2003/0212558 A1 * | 11/2003 | Matula | 704/260 |
| 2004/0003042 A1 * | 1/2004 | Horvitz et al. | 709/204 |
| 2004/0064504 A1 * | 4/2004 | Domschitz | 709/203 |
| 2004/0107360 A1 * | 6/2004 | Herrmann et al. | 713/201 |
| 2004/0205811 A1 * | 10/2004 | Grandy et al. | 725/28 |
| 2005/0041580 A1 * | 2/2005 | Petrovykh | 370/229 |
| 2005/0068167 A1 * | 3/2005 | Boyer et al. | 340/531 |
| 2005/0071428 A1 * | 3/2005 | Khakoo et al. | 709/204 |
| 2005/0083841 A1 * | 4/2005 | Zuberi | 370/230 |
| 2005/0102154 A1 * | 5/2005 | Dodd et al. | 705/1 |
| 2005/0102365 A1 * | 5/2005 | Moore et al. | 709/207 |
| 2005/0114496 A1 * | 5/2005 | Fang et al. | 709/224 |
| 2005/0164686 A1 * | 7/2005 | Bushnell et al. | 455/417 |
| 2005/0166260 A1 * | 7/2005 | Betts et al. | 726/4 |
| 2005/0210152 A1 * | 9/2005 | Hawes | 709/248 |
| 2006/0015609 A1 * | 1/2006 | Hagale et al. | 709/224 |
| 2006/0030316 A1 * | 2/2006 | Lando | 455/432.3 |
| 2006/0047742 A1 * | 3/2006 | O'Neill et al. | 709/203 |
| 2006/0052127 A1 * | 3/2006 | Wolter | 455/519 |
| 2006/0135182 A1 * | 6/2006 | Unmehopa | 455/456.6 |
| 2006/0136338 A1 * | 6/2006 | Maor | 705/51 |

* cited by examiner

*Primary Examiner* — Paul R Myers
*Assistant Examiner* — Christopher A Daley

(57) ABSTRACT

Methods and apparatus are provided for controlling an availability of a user in an enterprise environment. If an enterprise user requests to change an availability status on one or more media, a determination is made as to whether to grant the request based on one or more predefined criteria associated with the enterprise. For example, the predefined criteria may comprise resource needs or one or more policies of the enterprise. The predefined criteria may be expressed as one or more rules in a rule base.

20 Claims, 2 Drawing Sheets

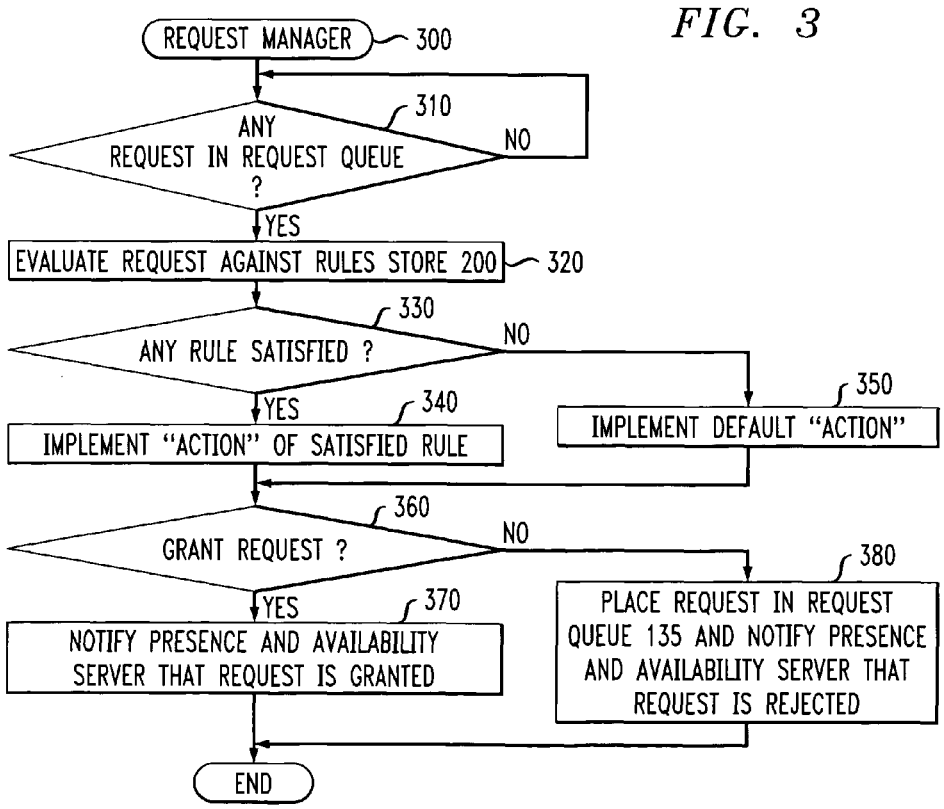

METHOD AND APPARATUS FOR ENTERPRISE BROKERING OF USER-CONTROLLED AVAILABILITY

FIELD OF THE INVENTION

The present invention relates generally to communication methods and systems, and more particularly, to methods and systems that control the availability of a user in an enterprise environment.

BACKGROUND OF THE INVENTION

In an enterprise environment, users in different roles, such as customers, agents, experts and supervisors, need to communicate with one another using one or more media such as Instant Messaging (IM), electronic mail or voice calls. Often, a user may log into a web-based portal that provides a composite medium for accessing different types of text or voice media. While a user's presence on a given media indicates that the user has logged into the media, the user's availability for communications is represented in many media by an availability indicator that may reflect different values, such as "available," "away," "do not disturb," "extended away," or "free to chat" depending on the user's actual availability for communications. The user may manually change his or her own availability settings as seen by other users and applications. In addition, a number of techniques have been proposed or suggested for automatically determining the availability of a user based on user activity, such as keyboard activity, calendar appointments or presence in a given area, such as an office. Users and software systems may utilize a user's availability information to decide whether or not to establish communication with that user.

Enterprises have become largely global with users in geographically distributed regions needing to interact with each other. These interactions may be initiated by a user or a software system that determines a need for the interaction. Users in an enterprise may have one or more roles that may require them to perform specific functions. For example, contact center agents provide support to customers that contact an enterprise with specific needs. In addition, an enterprise will often designate "experts" in various subject areas to help resolve issues or answer questions in the various subject areas. In another example, a system may detect that an item in an inventory is below a threshold and a conference call between certain people needs to be established to place an order for the item. The conference call to place an order for the item may require a person responsible for accounts, such as an accounts manager, a person who is responsible for supplies, and possibly, a supervisor.

The function of certain roles such as a contact center agent or an expert on the floor in a retail store may critically require communication media. User-initiated communications are commonplace in enterprises. However, as enterprise processes become more automated, an increasing number of communication interactions will be initiated by software that will need to set up communication between a group of users. The availability of users will be one of the factors that such a system or a user may inspect before deciding to communicate with the users to optimize the productivity of a communication.

While it is desirable to allow enterprise users to control their availability on various media, such user control actions may conflict with the resource needs and policies of an enterprise. For example, it may not be desirable to have contact center agents become unavailable during times of peak call volume in the contact center. In addition, if an enterprise policy requires at least one supervisor to be available at all times, the only currently available supervisor should not be allowed to become unavailable until another supervisor becomes available.

A need therefore exists for a mechanism for negotiating the availability of a user on one or more media in a manner that is consistent with the needs or policies (or both) of an enterprise.

SUMMARY OF THE INVENTION

Generally, methods and apparatus are provided for controlling an availability of a user in an enterprise environment. If an enterprise user requests to change an availability status on one or more media, a determination is made as to whether to grant the request based on one or more predefined criteria associated with the enterprise. For example, the predefined criteria may comprise resource needs or one or more policies of the enterprise. The predefined criteria may be expressed as one or more rules in a rule base.

The request to change the availability status will be denied if the request violates one or more of the predefined criteria. If the request is denied, the user is prevented from changing the availability status. The request can optionally be queued for automatic reevaluation if the request is denied.

A more complete understanding of the present invention, as well as further features and advantages of the present invention, will be obtained by reference to the following detailed description and drawings.

BRIEF DESCRIPTION OF THE DRAWINGS

FIG. 2 is a sample table from the rules store of FIG. 1; and

FIG. 3 is a flow chart describing an exemplary implementation of a request manager of FIG. 1.

DETAILED DESCRIPTION

Figure 1:
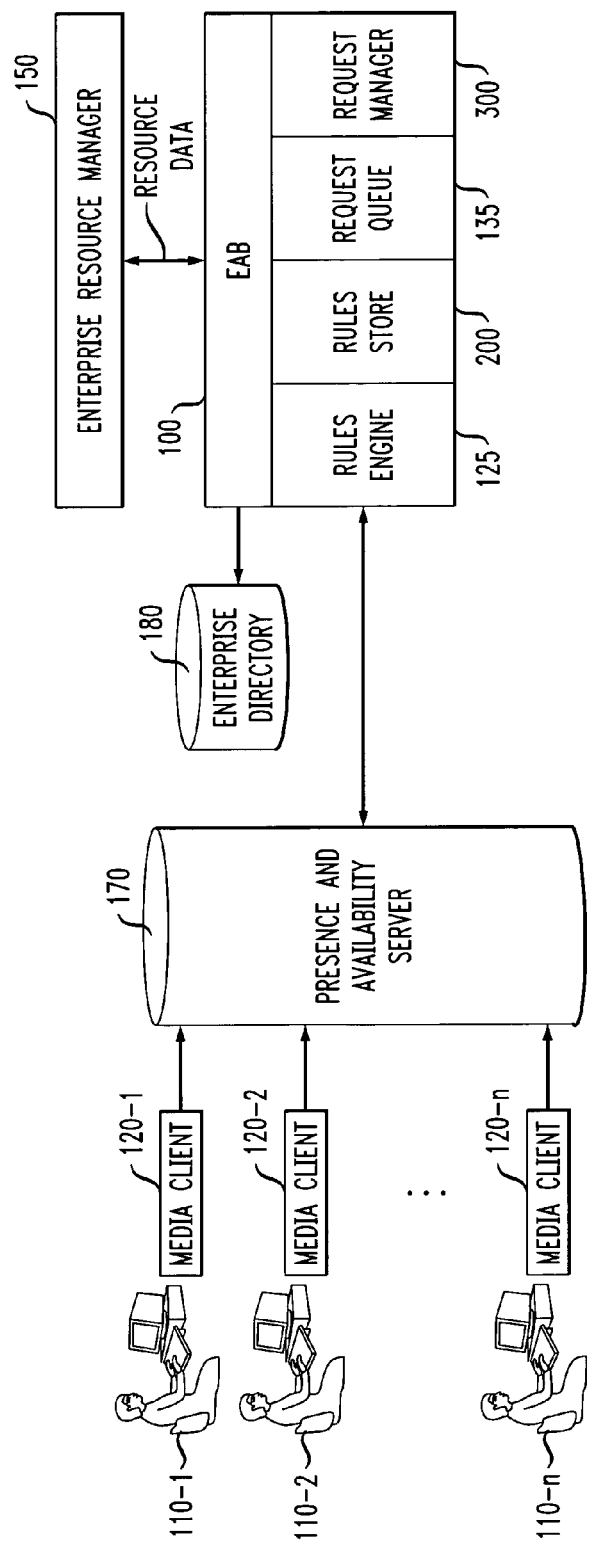
FIG. 1 is a schematic block diagram of an enterprise availability broker incorporating features of the present invention.

The present invention provides methods and apparatus for brokering user-controlled availability in an enterprise environment. FIG. 1 is a schematic block diagram of an enterprise availability broker (EAB) 100 incorporating features of the present invention. As shown in FIG. 1, one or more enterprise users 110-1 through 110-n (collectively, referred to as users 110) communicate, for example, over an enterprise network (not shown), by means of one or more corresponding media clients 120-1 through 120-n (collectively, referred to as media clients 120). Generally, the enterprise availability broker 100 resolves conflicts between user-controlled availability and the resource needs or policies (or both) of an enterprise. In particular, the enterprise availability broker 100 negotiates a user's control of availability with the resource needs or policies (or both) of the enterprise.

As shown in FIG. 1, an enterprise resource manager 150 provides resource data that quantifies the resource needs of the enterprise. The enterprise resource needs can be quantified in any known manner and will generally vary from enterprise to enterprise. In an enterprise involving contact centers, for example, the resource data may comprise incoming call volume, queue size or average hold time for a contact center. In an enterprise that wants to manage the availability of supervisors or subject matter experts during communication sessions, the resources may be the number of available supervisors or available experts on the information relating to the communication sessions. In further variations, the enterprise resource manager 150 can quantify the number of employees currently on duty, optionally on a role-by-role basis. Enterprise resource data may be distributed across several servers in the enterprise, such as a presence and availability server 170 and an LDAP server 180. Note that an enterprise resource manager 150 is a virtual composite representation of resource data that may be distributed across a variety of sources in the enterprise.

The policies of the enterprise can be specified, for example, using rules that define the enterprise policies. The exemplary enterprise availability broker 100 contains a rules-based engine 125 to process the rules and a rules store 200, discussed below in conjunction with FIG. 2. The rules engine 125 may be embodied using a commercially available rules engine, such as the ILOG rules engine. Generally, the rules engine 125 allows the execution of rules. The rules store 200 stores the rules in a fixed format. The rules in the rules store 200 are interpreted by the rules engine 125. As discussed further below, one or more conditions of a rule may depend on the resource data provided by the enterprise resource manager 150 or on one or more properties of the users 110, such as roles or how long a given user has been unavailable.

Thus, as shown in FIG. 1, the enterprise availability broker 100 may access an enterprise directory 180 to determine information about the users 110. Generally, an enterprise directory 180 records information on the employees of an enterprise, such as one or more roles for each user. The enterprise directory 180 may be embodied, for example, as a Lightweight Directory Access Protocol (LDAP) directory. A presence and availability server 170 stores and manages the presence and availability status of the users in the enterprise. The media clients 120 contact the presence and availability server 170 for a change in the status of their presence or availability.

The enterprise availability broker 100 also includes a request queue 135 and a request manager 300, as discussed further below in conjunction with FIG. 3. When a user 110 tries to change his or her availability status on a particular media, for example, from "available" to "away," the relevant media client 120 contacts the presence and availability server 170 that forwards the request to the enterprise availability broker 100, where the request is queued in the request queue 135. Note that it is conceivable that a system other than a media client 120, such as a reservation system, that needs to reserve a user for some activity may submit a request on behalf of a user. As discussed further below, the request manager 300 processes each request in the request queue 135 to determine if the request should be granted, based on the rules in the rules store 200.

FIG. 2 is a sample table from the rules store 200 of FIG. 1. The rules in the rules store 200 represent the enterprise rules on availability. As previously indicated, the rules in the rules store 200 are interpreted on the rules engine 125. As shown in FIG. 2, the exemplary rules store 200 is comprised of a plurality of records, each associated with a different rule. For each rule, identified in field 220, the rules store 200 identifies the conditions associated with the rule in field 230 and the corresponding action in field 240 that is performed when the conditions are satisfied. While the exemplary rules are expressed using a Condition→Action format, other notations are possible. It is noted that conditions may be combined by using Boolean operators such as AND, OR, and NOT, as would be apparent to a person of ordinary skill in the art.

For example, the rules recorded in records 202 and 204 prioritizes the enterprise resource needs over user-controlled availability. Thus, when incoming contacts in a contact center are of a high volume, rule 202 may prevent several agents from changing their status to unavailable. Similarly, when a meeting about an important topic is in progress, rule 204 may require that one or more subject matter experts are available throughout the meeting so that they may be bridged into the meeting if the need arises.

The rules recorded in records 206, 208 and 210 address conflicts between enterprise policies and user-controlled availability. For example, an enterprise may have a policy on how long a user should be available during specific intervals of time and user actions on availability may be violating that policy (rule 206). In addition, the enterprise may have policies on the availability of certain roles, such as policies requiring at least one supervisor to be available at all times (rule 208) or at least one user in a group needs to be available (rule 210). Note that this group can represent expertise on a subject.

Note that, to keep the conditions in the rules in records 202-210 brief, the required additional condition on the type of request such as "if request is to change availability to AWAY/UNAVAILABLE" has been omitted. This condition needs to be joined with a Boolean AND to the rest of the conditions in records 202-210.

FIG. 3 is a flow chart describing an exemplary implementation of a request manager 300. Generally, the request manager 300 processes each received request to determine if the request should be granted, based on the rules in the rules store 200.

Requests for changes in availability are queued in the request queue 135. As shown in FIG. 3, the request manager 300 periodically checks the request queue for any queued request during step 310. If there is such a request, the request manager 300 evaluates the request during step 320 against all the rules in the rules store 200. A test is performed during step 330 to evaluate the satisfiability of all the conditions in the rules. If it is determined during step 330 that a given rule is satisfied, then the corresponding action associated with the rule is executed during step 340. If, however, it is determined during step 330 that no rule is satisfied, then a default action is executed during step 350, such as granting the request.

If it is determined during step 360 that the action specifies that the request for change in availability status should be granted, a reply is sent to the presence and availability server 170 during step 370 that the request is granted. Otherwise (request should be rejected), the request is placed during step 380 back in the Request Queue 135 and a reply is sent back to the presence and availability server 170 that notifies the media client 120 stating that the request is rejected and the media client 120 should await notification about the change in availability status.

If the conditions of more than one rule in the rules store 200 are satisfied, then a rule with the action that rejects the request will take priority over other rules. In a further variation, the rules can be stored in an ordered list in the rules store 200, such that the first rule to be satisfied determines the corresponding action.

The request manager 300 can evaluate the test condition of step 310 at periodic time intervals to evaluate a queued request or may be triggered to evaluate a newly arrived request. If a request can be granted, the request manager 300 grants the request by sending a notification to the media client and removing the request from the request queue 135. Otherwise, the request is retained in the request queue 135 unless the enterprise availability broker 100 receives a request removal message from the media client 120.

A media client 120 waits for a reply to the request for change in availability status from the request manager 300 of the enterprise availability broker 100. If the request is granted by the request manager 300, the presence and availability server 170 changes the availability status for the user 110 and notifies the client 120. Otherwise, the presence and availability server 170 notifies the media client 120 that the availability status cannot be changed at this time. Note that the system can change the availability of the user to a special status such as "REQUESTING CHANGE FROM STATE X TO STATE Y" so that other systems that check on the user's availability status know that the user is requesting a change and should not be engaged unless the matter is urgent.

Note that the request queue 135 may implement an aging scheme for the requests that are placed back in the queue whereby requests are tagged with a counter that reflects the amount of time they have been placed back in the queue. Newly arriving requests will get priority over aged requests by the request manager 300 and schemes for prioritizing among aged requests may be used. Requests that have greatly aged may be removed from the queue 135 after notifying/confirming with the presence and availability server 170. Additionally, when an aged request is granted, the presence and availability server 170 is notified that the request is an aged request and the presence and availability server 170 may request confirmation from the media client 120 that the need for the requested availability change still exists before actually making the change.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   receiving a request from an enterprise user to change a user-controlled availability status of the enterprise user for a communication in an enterprise communication environment;
   routing the request to a request queue at an enterprise associated with the enterprise communication environment;
   identifying an enterprise rule and a resource need for processing queued requests, wherein the enterprise rule comprises a priority of the resource need with respect to user-controlled availability, and wherein the resource need is quantified based on enterprise resource data to yield a resource need value, the enterprise resource data being based on a variety of sources in the enterprise, and the resource need comprising one of a workload, an enterprise service demand, an expertise requirement, and a user demand; and
   brokering the change to the user-controlled availability status based on the request, the policy, and the resource need value to yield a brokered response to the request from the enterprise user.

2. The method of claim 1, wherein the brokering is further based on an attribute of the enterprise user.

3. The method of claim 2, further comprising determining the attribute of the enterprise user based on an enterprise directory of users.

4. The method of claim 1, brokering the change comprises:
   rejecting the request based on at least one of the enterprise rule and the resource need;
   placing the request back in the request queue for future re-evaluation of the request, wherein a re-evaluation of the request is triggered at periodic time intervals.

5. The method of claim 1, wherein a request manager is configured to send a notification to the enterprise user and remove the request from the request queue when the request is granted after the re-evaluation.

6. The method of claim 5, wherein the request queue implements an aging scheme for requests that are placed back in the request queue, wherein requests that are placed back in the request queue are tagged with a counter that reflects the amount of time they have been placed back in the request queue, the aging scheme defining respective priorities for aged requests in the request queue, and wherein the enterprise user is prevented from changing the user-controlled availability status when the request is rejected.

7. The method of claim 5, wherein the request is queued for reevaluation when the request is denied.

8. The method of claim 1, wherein the request is processed by a client.

9. The method of claim 1, wherein the request is processed by a presence and availability server.

10. A system comprising:
    a processor; and
    a computer-readable storage device storing instructions which, when executed by the processor, cause the processor to perform operations comprising:
       receiving a request from an enterprise user to change a user-controlled availability status of the enterprise user for a communication in an enterprise communication environment; and
       routing the request to a request queue at an enterprise associated with the enterprise communication environment;
       identifying an enterprise rule and a resource need for processing queued requests, wherein the enterprise rule comprises a priority of the resource need with respect to user-controlled availability, and wherein the resource need is quantified based on enterprise resource data to yield a resource need value, the enterprise resource data being based on a variety of sources in the enterprise, and the resource need comprising one of a workload, an enterprise service demand, an expertise requirement, and a user demand; and brokering the change to the user-controlled availability status based on the request, the policy, and the resource need value to yield a brokered response to the request from the enterprise user.

11. The system of claim 10, wherein the brokering is further based on an attribute of the enterprise user.

12. The system of claim 11, the computer-readable storage medium having stored therein additional instructions which, when executed by the processor, result in an operation further comprising determining the attribute of the enterprise user based on an enterprise directory of users.

13. The system of claim 10, wherein brokering the change comprises:
rejecting the request based on at least one of the enterprise rule and the resource need;
routing the request back to the request queue for a re-evaluation of the request at periodic time intervals.

14. The system of claim 13, wherein a request manager is configured to send a notification to the enterprise user and remove the request from the request queue when the request is granted after the re-evaluation.

15. The system of claim 14, wherein the request queue implements an aging scheme for requests that are placed back in the request queue, wherein requests that are placed back in the request queue are tagged with a counter that reflects the amount of time they have been placed back in the request queue, the aging scheme defining respective priorities for aged requests in the request queue, and wherein the enterprise user is prevented from changing the user-controlled availability status when the request is rejected.

16. The system claim 14 wherein the request is queued for reevaluation when the request is denied.

17. The system of claim 10, wherein the request is processed by a client associated with the system.

18. The system of claim 10, wherein the request is processed by a presence and availability server associated with the system.

19. A computer-readable storage device storing instructions which, when executed by a processor, cause the processor to perform operations comprising:
receiving a request from an enterprise user to change a user-controlled availability status of the enterprise user for a in an enterprise communication environment;
routing the request to a request queue at an enterprise associated with the enterprise communication environment;
identifying an enterprise rule and a resource need for processing queued requests, wherein the enterprise rule comprises a priority of the resource need with respect to user-controlled availability, and wherein the resource need is quantified based on enterprise resource data to yield a resource need value, the enterprise resource data being based on a variety of sources in the enterprise, and the resource need comprising one of a workload, an enterprise service demand, an expertise requirement, and a user demand; and brokering the change to the user-controlled availability status based on the request, the policy, and the resource need value to yield a brokered response to the request from the enterprise user, wherein the enterprise user is associated with an enterprise.

20. The computer-readable storage device of claim 19, wherein the criterion is expressed as a rule in a rule base, and wherein brokering is further based on an attribute of the enterprise user.

* * * * *